Feb. 3, 1931.     H. C. WRIGHT     1,790,891
HOSE COUPLING
Filed May 24, 1928
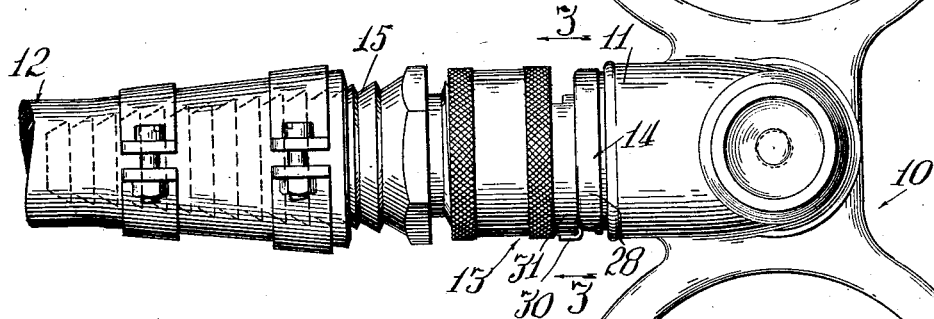
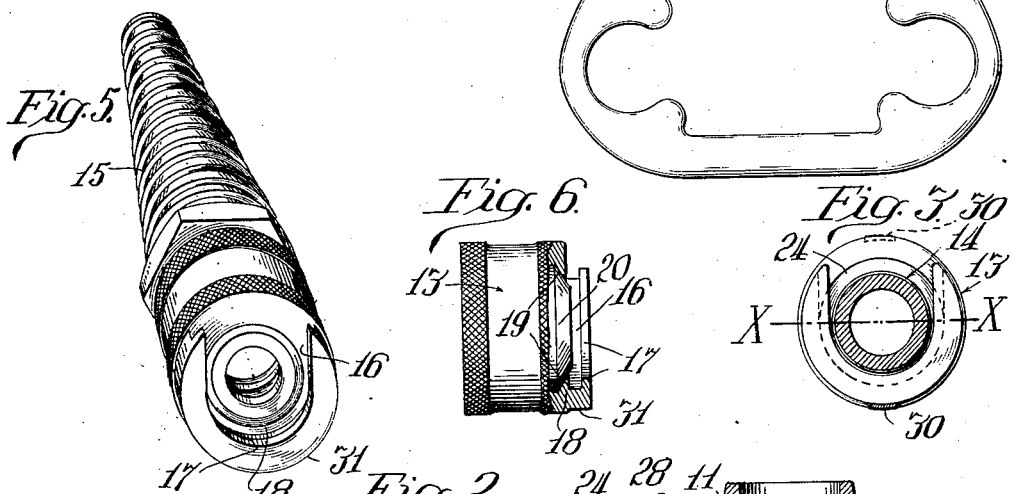
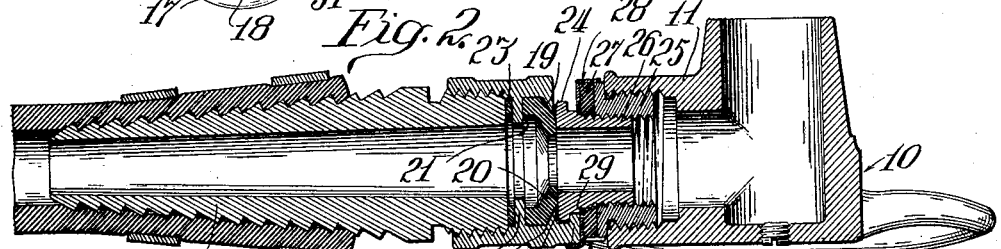
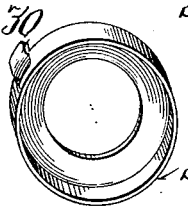
Inventor
Horace C Wright
By Barnett & Truman
Attorneys Patented Feb. 3, 1931

1,790,891

UNITED STATES PATENT OFFICE

HORACE C. WRIGHT, OF OAK PARK, ILLINOIS, ASSIGNOR TO CHICAGO FLEXIBLE SHAFT COMPANY, OF CHICAGO, ILLINOIS, A CORPORATION OF ILLINOIS

HOSE COUPLING

Application filed May 24, 1928. Serial No. 280,202.

My invention relates to couplings for uniting sections of hoses or pipes and particularly to a coupling of this character in which the coupling members are moved laterally into interlocking engagement with each other.

The principal object of the invention is to provide an improved and inexpensive means for effecting a positive lock between the said coupler members when they are in their interlocked engagement.

A more specific object is to provide an improved lock of the above character which will be suitable for use in connection with conduit couplings having capacity for relative rotational movement when said coupling members are operatively interlocked with each other and which will maintain the coupler members in axial alignment.

Another object is to provide a lock which will form a permanent part of one of the coupling members, which will not add to the size of the coupling, and which when the couplings are interlocked may be operated through a relatively large arc without affecting the locking function.

The invention has for further objects the provision of coupler members having improved interlocking members and of such other new and improved constructions, arrangements and combination of coupler members and locking means therefor as will be hereinafter described and included in the scope of the appended claims.

The invention is illustrated in the accompanying drawing wherein,

Fig. 1 is a view in elevation of a conduit coupling provided with my improved locking means.

Fig. 2 is a section taken through the conduit and coupling shown in Fig. 1, illustrating the position of the locking means when the coupler members are interlocked with each other.

Fig. 3 is a cross sectional view taken on line 3—3 of Fig. 4 illustrating a portion of my improved lock, in section.

Fig. 4 is a view in perspective of the locking means employed in connection with hose couplings of the type illustrated in the drawing.

Fig. 5 is a view in perspective of one of the coupler members and a portion of the conduit section to which it is attached, and Fig. 6 is a view partly in section and partly in elevation of one of the coupler members illustrating the construction of that portion of the member adapted to interlock with a co-engaging coupler member.

In the drawings I have shown my improved coupler member in connection with a hose and lawn sprinkler. The base portion of the lawn sprinkler is indicated by the reference numeral 10. The base is formed with an inlet socket 11 to which a section of garden hose 12 is connected, by means of my improved coupler. The hose coupler consists preferably of two interlocking members 13 and 14, the latter of which is threaded into the socket 11 of the sprinkler base and the former of which has a threaded engagement with a core member 15, which is clamped within the section of garden hose 12. The coupler member 13 consists of a hollow cylindrical body, one end of which is threaded on the said core 15, and the other end of which is formed with a U-shaped slot, opening through one side of the body and forming inwardly projecting flanges 17—18. The flange 18 is formed preferably with a knife edge and the inner face 19 is tapered to form a conical seat for a resilient gasket 20. The gasket is preferably of a cup shaped configuration and fits snugly within a pocket defined by the inner face 19 of the flange 18 and the side face 21 of an inwardly projecting flange 22 formed integrally with the coupler member. A resilient gasket 23 is interposed between the flange 22 and the end of the cone plug 12 so as to form a fluid-tight connection at this point. The cup gasket 19 preferably projects through the orifice defined by the flange 18 so as to be compressed when the coupler member 19 is interlocked with its coengaging coupling member. The inner face 23 of the flange 17 is preferably flat and at right angles to the axis of the coupling and serves as a locking shoulder for engagement with the flange 24 of a nipple member forming a part of the coengaging coupling member.

The coupler member 14 consists preferably of a screw plug 25 threaded into the socket 11 and which in turn carries the flanged nipple 26, the outer face of which bears against the resilient cup washer previously described. A spring follower, consisting of a spring washer 27 and a housing 28 for the same, is interposed between the end face of the screw plug 25 and a stop shoulder 29 formed on the nipple 26. The housing 28 and the spring washer 27 are rotatable about the nipple 26 but are limited in their movements longitudinally of the coupling by means of the abutment shoulder 29. The flange of the housing member 28 is preferably punched to form a tongue portion 30, which is bent forwardly so as to project over the cylindrical portion 31 of the adjacent coupler member, when the coupling members are interlocked with each other.

While I have shown in the drawings a projection formed by punching out a portion of the housing, the said projection 30 may be formed in any other suitable manner.

In operation, the flange 24 of the nipple 26 is inserted in the U-shaped slot 16 so as to interlock with the flange 17 of the coupling member 13. When the coupling members are forced to their axial alignment, the spring follower exerts pressure against the end face of the flange portion 17 and the cup shaped washer exerts pressure against the outer face of the nipple 26 and thereby forms a resilient means for maintaining the coupler members in their interlocked position. When it is desired to provide a positive lock for the coengaging couplers the spring housing 28 may be so rotated as to move the tongue 30 from the position indicated in dotted lines in Fig. 3 to any point below the horizontal center of the coupler, as illustrated in this figure by the lines X—X. Any position of the projection 30 below the horizontal center of the coupling provides a positive lock which will prevent the coupler members from being moved laterally with relation to each other, but which nevertheless will permit relative rotational movement of the coupler members about their horizontal axes. It will be perceived by an inspection of Fig. 3 of the drawings that the locking tongue 30 may be moved to any position below the horizontal line X—X without affecting the positive locking engagement of the coupler members. The frictional contact of the housing 28 with the end face of the flange 17 is greater than the frictional area engaged by the said spring washer 27, with the result that the said housing normally remains in its adjusted position relative to the coengaging coupler member 13 when it has been rotated into a position to provide a positive lock for the coupler member.

While I have illustrated my improved positive locking means in connection with the specific form of coupling member shown herein, it will be obvious that such locking mechanism might be applied to other types of couplers. It will be understood, therefore, that I do not wish to limit myself to the use of the positive lock to the type of coupling shown in the accompanying drawings, except in so far as the appended claims are so limited.

I claim:

1. A conduit coupling comprising two coupling members movable laterally into interlocking and joint sealing engagement with each other and having capacity for relative rotational movement while in their joint sealing positions, and means rotatable about the axis of one coupler member for positively locking said members against disengagement.

2. A conduit coupling comprising two coupler members movable laterally into interlocking and joint sealing engagement with each other and having capacity for relative rotational movement while in their joint sealing positions, a locking member on one of said coupler members adapted to bear with resilient pressure against a portion of the other coupler and provided with a portion overlying a part of said other coupler and rotatable about the longitudinal axis of said coupler members to lock them in their operative engagement.

3. A conduit coupling comprising two coupler members movable laterally into interlocking and joint sealing engagement with each other and having capacity for relative rotational movement while in their joint sealing positions, a spring pressed member carried by one coupler member and rotatable about the axis thereof to provide a positive lock for maintaining the coupler members in their operative engagement.

4. A conduit coupling comprising two coengaging coupler members movable laterally into interlocking and joint sealing engagement with each other and having capacity for relatively rotational movement while in their joint sealing positions, and a resilient member carried by one coupler member exerting pressure longitudinally of the coupler members and a housing for said resilient member and provided with a projection overlying a side face of the other coupler rotatable about the axis of said coupler member to provide a positive lock for maintaining the coupler members in their operative positions.

5. A coupling for conduits comprising two hollow coupler members arranged in longitudinal axial alignment and interlocked to provide a straight passage from one conduit section to the other, one of said coupler members being provided at one end with a transverse slot providing an inwardly projecting flange, a resilient gasket arranged in the port end of said coupler member, the other coupler member being formed with means adapted to interlock with said inwardly projecting flange, means comprising a spring for exerting pressure longitudinally of the coupler members to hold them in their interlocked positions, and a locking member manually operable and rotatable about the axis of said coupler members to lock them in their said positions of longitudinal axial alignment.

6. A coupling for conduits comprising two interlocking coupling members, one of which is formed at one end with an inwardly projecting flange having a flat surface and the other of which is formed with means interlockingly engaging the flat surface of said inwardly projecting flange, resilient means providing a fluid tight connection between the couplers, means comprising a resilient washer carried by one of the coupler members, for exerting pressure longitudinally of the couplers to maintain them in their interlocked positions, a housing for said washer adapted to bear against the end face of said inwardly projecting flange, and formed with a projection which overlaps the end of the coengaging coupler member and is rotatable about the axis of the coupler member on which it is supported to provide a positive lock against the lateral movement of the coupler members in a direction to disengage them.

HORACE C. WRIGHT.